MACH NUMBER AND AIRSPEED COMPUTER WITH CORRECTION DIFFERENTIAL

Filed June 30, 1954 4 Sheets-Sheet 1

INVENTOR.
PAUL L. REUTER
BY Herbert Smith
ATTORNEY

MACH NUMBER AND AIRSPEED COMPUTER WITH CORRECTION DIFFERENTIAL

Filed June 30, 1954 4 Sheets-Sheet 2

INVENTOR.
PAUL L. REUTER
BY Herbert H. Smith
ATTORNEY

MACH NUMBER AND AIRSPEED COMPUTER WITH CORRECTION DIFFERENTIAL
Filed June 30, 1954 4 Sheets-Sheet 3
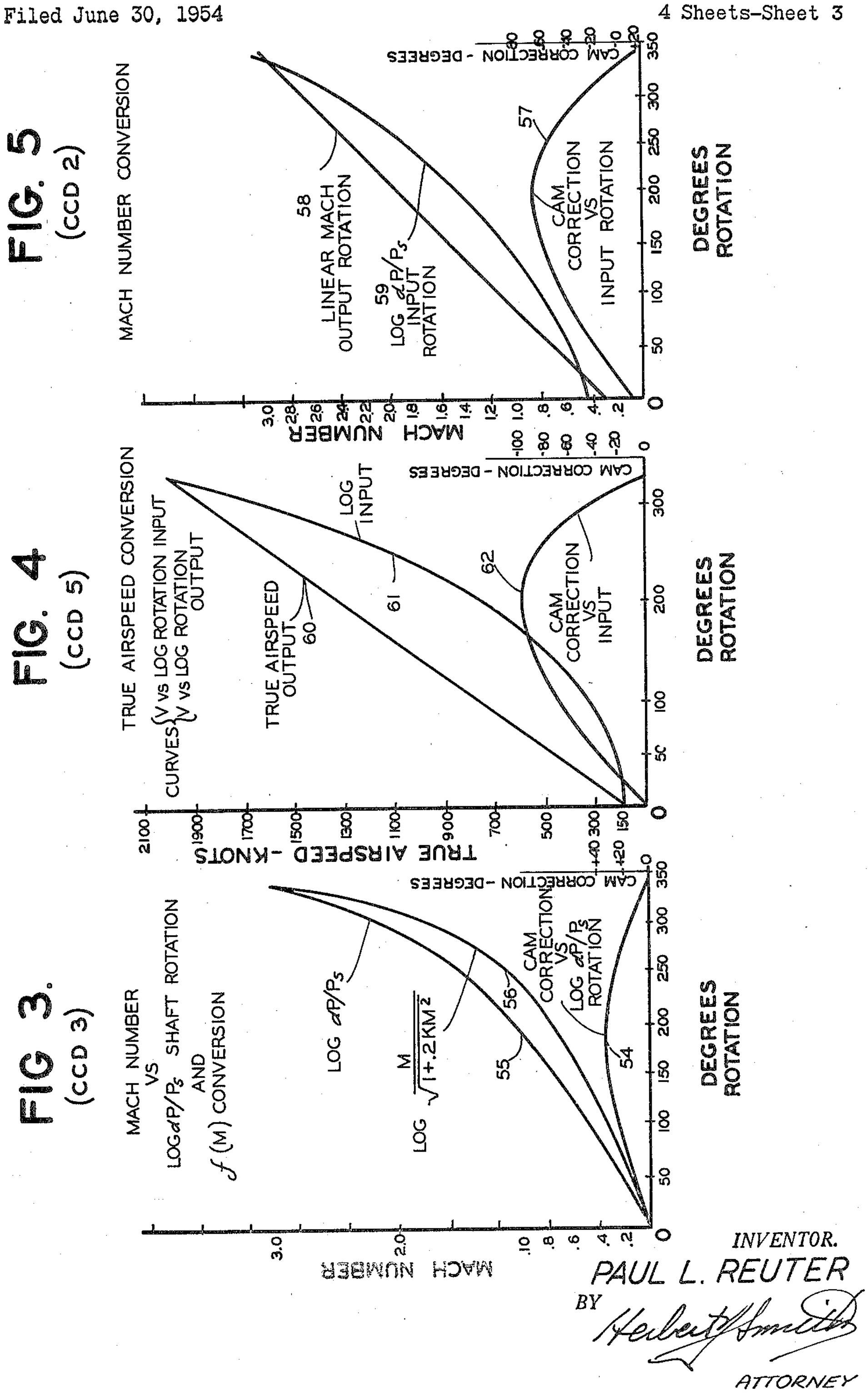
FIG. 5 (CCD 2), FIG. 4 (CCD 5), FIG 3. (CCD 3)
INVENTOR.
PAUL L. REUTER
BY Herbert Smith
ATTORNEY

MACH NUMBER AND AIRSPEED COMPUTER WITH CORRECTION DIFFERENTIAL

Filed June 30, 1954 4 Sheets-Sheet 4

INVENTOR.
PAUL L. REUTER
BY Herbert Smith
ATTORNEY 2,969,910
Patented Jan. 31, 1961

2,969,910

MACH NUMBER AND AIRSPEED COMPUTER WITH CORRECTION DIFFERENTIAL

Paul L. Reuter, Franklin Lakes, N.J., assignor to The Bendix Corporation, a corporation of Delaware Filed June 30, 1954, Ser. No. 440,395

8 Claims. (Cl. 235—61)

This invention relates to computers, and more particularly to a method and means of computing air data functions.

Heretofore, computers of the general type employing at least one cam, particularly in air data computer systems, utilized linkages, individual differentials, gears, synchros, and a multiplicity of arrangements of components to obtain mathematical computation by mechanical methods.

Previous devices were bulky and required appreciable space for installation, the mass of equipment increased the weight of the device, and the number of moving parts increased the percentage of equipment failure with attendant delays. Moreover, in conventional computers utilizing a cam, the cam generates the total output motion, and therefore any error in the camming operation is proportional to the total output. The output is limited usually to 90° rotation and the output error is further amplified by the set-up gearing required to obtain rotations at beyond the 90° limit.

The cam correcting differential of the present invention generates only the correction between the input and the output. Therefore, any error in the camming operation is proportional to the correction only. The cam correction is introduced in the spider of the cam correcting differential thereby taking advantage of the 2 to 1 gain factor inherent in a differential. This method allows practically unlimited cam correction and greatly increases the obtainable output accuracy.

In the computer of the present invention, equivalent mathematical computations are obtained by mechanical means which is comparatively extremely light in weight, very small in size, has a minimum of moving parts, is more accurate, and yet unusually robust.

The present invention, when used as an air data computer, senses three basic air flight variables, namely, static pressure, differential pressure, and air temperature to provide a computer and indicator for a multiplicity of air datum outputs such as true airspeed, Mach number, air density and other quantities that require the modification of a given mechanical rotation to a function of the given rotation.

It is an object of the present invention to provide a novel method and means for computing air data functions.

Another object of the invention is to provide a novel air data computer incorporating mechanical differentials and cams for solving equations in aerodynamics.

Another object is to provide a computer utilizing a novel cam correcting differential.

A further object is the provision of an air data computer employing novel means for obtaining mathematical computations by mechanical methods and means.

A further object of the invention is the provision of novel means for the modification of a given mechanical rotation to a function of the given rotation.

A further object is to provide a novel cam correcting differential having one input and one corrected output.

Another object is to provide a differential device usable in a computer having one input and one output, with a cam interposed in the spider gearing to obtain a modified function in accordance with the cam characteristics.

Another object is to provide a computer system employing one or more cam correcting differentials for modifying an output in accordance with an aerodynamic formula.

Another object of the invention is the provision of computer means usable for variable of air flight for continuously modifying the output as a function of the input.

Another object is to provide novel computer means which has a minimum of moving parts, is extremely light in weight, greatly reduces space requirement, is more efficient and is robust.

The present invention contemplates a computer which may be used for air data for modifying an output of a unitary differential device in accordance with the contour of a cam coupled to the spider of said unitary differential device. Therefore, it is possible to get a modified function in one of many forms, as the output of a unitary differential device, depending on the shape of the cam as dictated by the particular function or results desired, whereby a novel differential includes means for providing a correction factor while using only one input to obtain a single corrected output.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
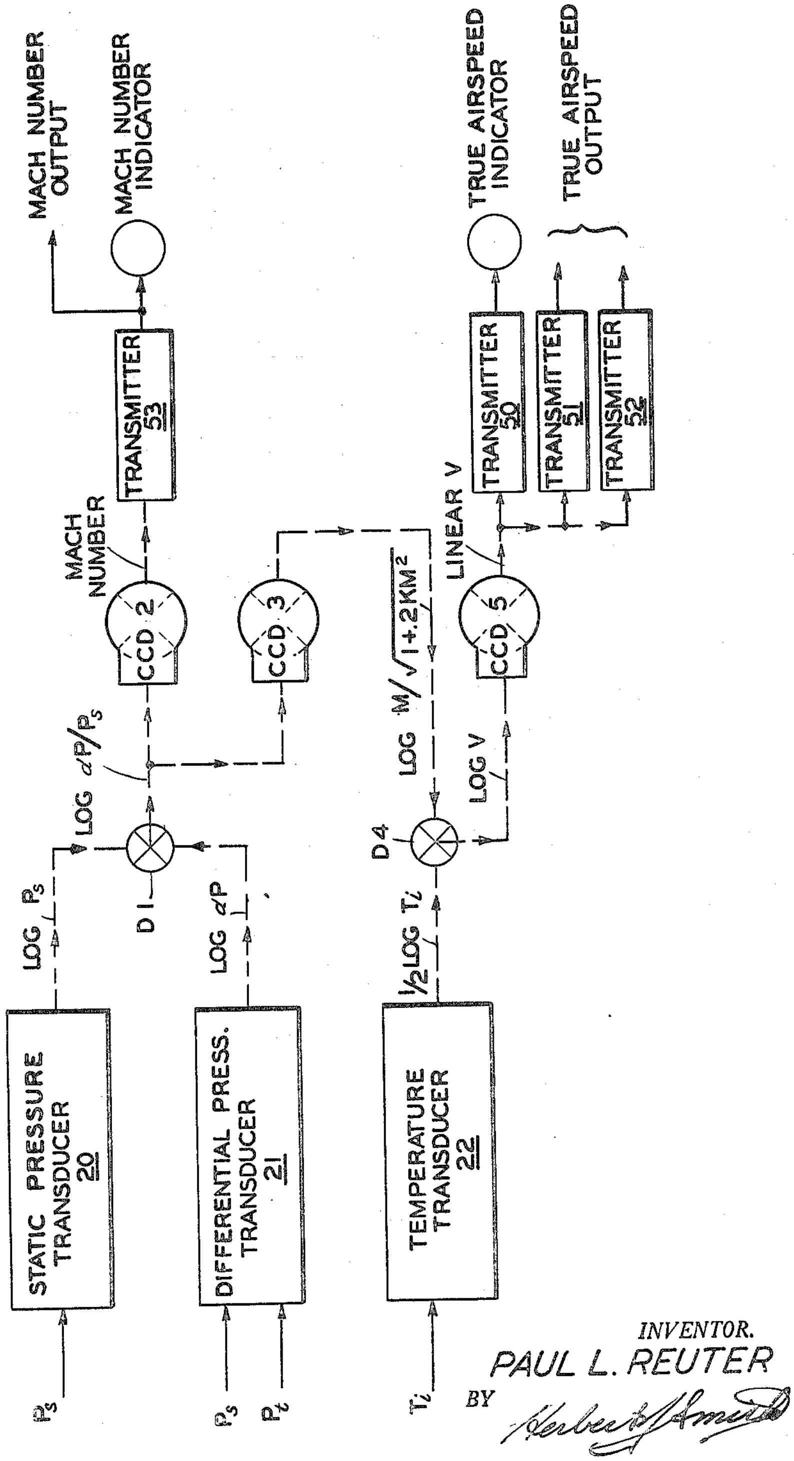
Fig. 1 is a schematic showing of one form of an air data computer employing cam correcting differentials.
Figures 2, 7:
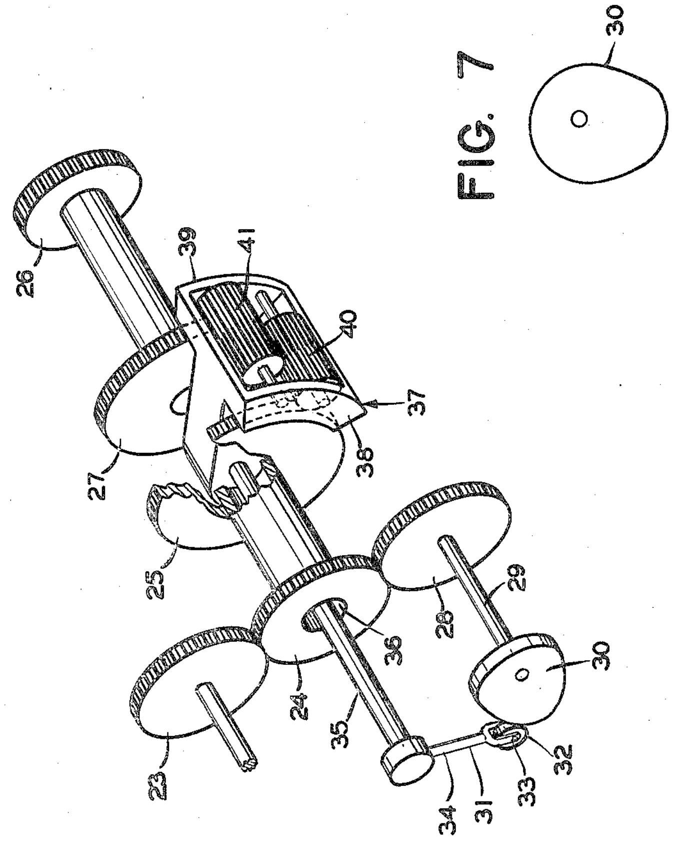
Fig. 2 is a perspective view, partly broken away, of one form of a cam correcting differential.
Figure 6:
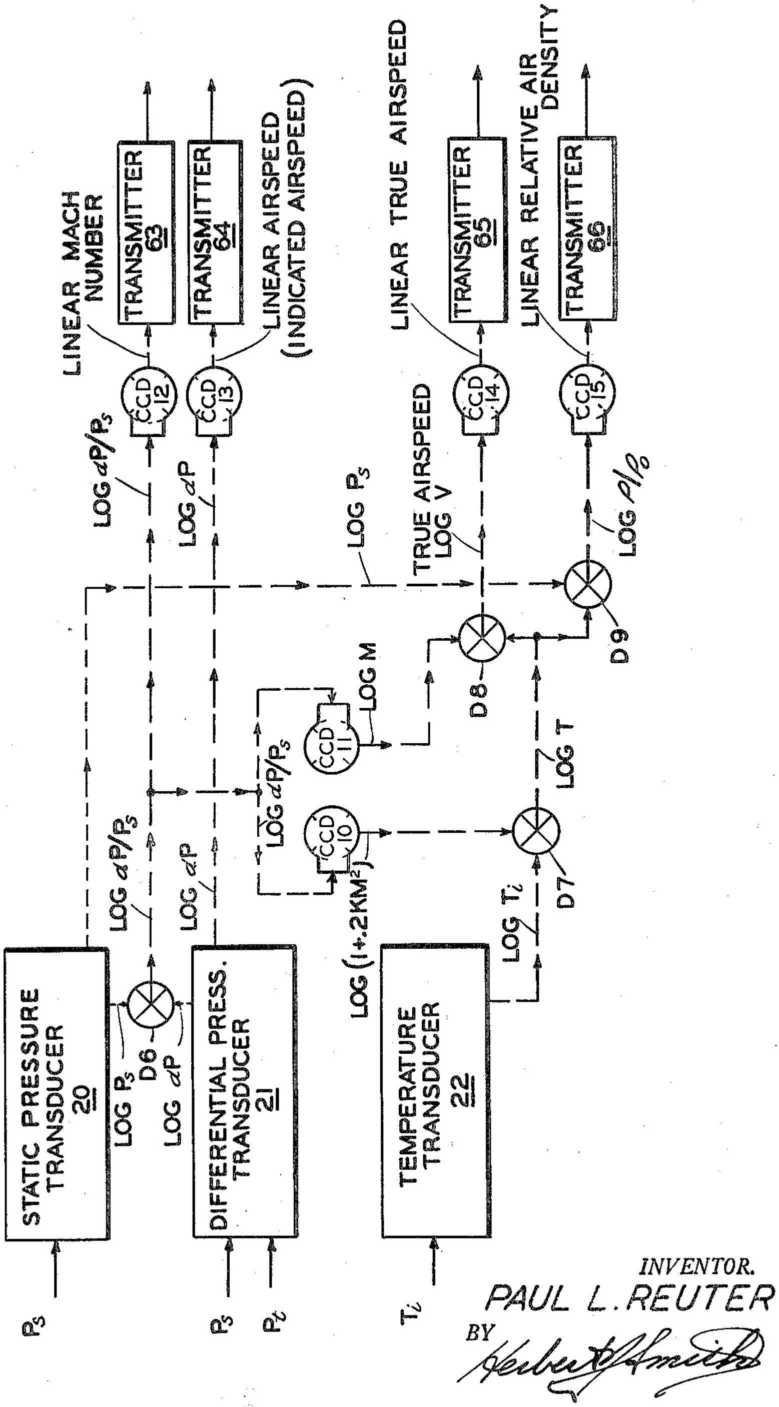

Fig. 3 embraces a set of curves for the cam correcting differential CCD3 of Fig. 1;

Fig. 4 embraces a set of curves for the cam correcting differential CCD5 of Fig. 1;

Fig. 5 embraces a set of curves for the cam correcting differential CCD2 of Fig. 1;

Fig. 6 is a schematic drawing of another form of an air data computer utilizing cam correcting differentials; and Fig. 7 is an approximate shape for a cam of a cam correcting differential for converting from linear functions to logarithmic functions.

Referring to the drawings, and more particularly to Fig. 1, there is shown a schematic diagram of an air data computer employing the invention, and wherein three air flight variables are impressed upon the computer to provide outputs which may indicate at least Mach number and true airspeed.

A static pressure transducer 20, has an input from any suitable static pressure source as indicated by the legend $P_s$.

A differential pressure transducer 21, has two inputs from suitable static and total pressure sources as indicated by the legends $P_s$ and $P_t$, respectively, to provide differential pressure ($dP$).

A temperature transducer 22, has an input from any suitable source, such as a temperature probe responsive to ambient temperature, as indicated by legend $T_1$.

The static pressure transducer may be any conventional or convenient type which converts static pressure ($P_s$) to mechanical rotation proportional to the log of static pressure ($\log P_s$).

The differential pressure transducer may be any conventional or convenient type for converting differential pressure ($dP$) to a mechanical rotation proportional to the log of differential pressure (log $dP$).

Any type of temperature transducer may be employed and may be used in conjunction with any conventional or convenient type of temperature probe. The temperature transducer converts indicated temperature ($T_i$) to mechanical rotation proportional to the log of indicated temperature. The legend ½ log $T_i$ indicates that the square root of the indicated temperature ($T_i$) is used in the computation of true airspeed, any conventional mechanical means may be incorporated to provide the quantity.

The several pressure and temperature transducers are coupled through conventional differentials and cam correcting differentials to output transmitters, and the remainder of Fig. 1 will be discussed in detail after some comment concerning differentials, cams, and cam correcting differentials in general.

Functional schematic drawings of differentials usually show the conventional method of representation by the use of a crossed circle with the spider represented by a line to the center of circle and the two inputs shown by lines contiguous with opposing sides of the circle. Arrows clearly indicate the inputs and outputs of the respective conventional differentials.

As is well known, differentials will add or subtract. Thus, if the two inputs rotate in the same direction, the spider will represent the sum of the two inputs, and if the two inputs rotate in opposite directions, the spider will represent the difference between the two inputs. Consequently, the spider will continuously give the algebraic sum of the angular movements of the two side or differential gears, or two inputs. It is to be understood that the spider does not necessarily have to represent the output element, as any two of the three elements may be the inputs and the remaining element will furnish the output.

Accordingly, it is possible to generate from a straight line any curve by adding or subtracting various amounts relative to the reference line. Therefore, a device which adds or subtracts various amounts as above indicated can be used to generate a desired curve.

The cam correcting differential of the present invention is a unitary device which utilizes a cam for generating a curve which is included in the functional operation of the device.

Consequently, it is possible to utilize a differential mechanism combined with a cam for the modification of a given mechanical rotation to a function of the given rotation. By this arrangement, a unitary cam correcting differential is provided for continuously modifying the output as a function of the input. It is possible to convert rotational motion from log to linear, linear to log, log to square or cube, linear to square or cube, square or cube to linear or log, and many other combinations.

Assume that it is desired, by conventional methods, to provide modification of a mechanical rotation to convert a linear rotation to a logarithmic rotation. In order to perform this modification by conventional means directly with a cam and follower, the cam must be cut so that its radii are proportional to the log of its rotation. The cam would then take a shape whereby the circumference at an extreme maximum radius of the cam would be angularly disposed immediately adjacent the circumference at an extreme minimum radius of the cam, the slope of the circumference between said two radii in one direction being extremely steep, and the circumference in the other direction forming a spiral curve of somewhat less than 360° between the radii to complete the 360° circumference. In a camming operation employing this type of conventional cam, the cam follower rotation, and therefore, the output rotation, is limited by the maximum and minimum radii of the cam. To obtain a desirable output rotation, the follower motion must be geared up to the desired value to amplify any errors resulting from the camming operation as a direct function of the step-up ratio. The camming operation is further hindered by loading effects caused by the rapid changes of slope and radii required.

To perform a similar modification with a cam correcting differential, the cam is cut so that its radii are proportional to one-half of the difference between the log and linear rotation. The cam would then take a shape somewhat similar to that shown in Fig. 7. The output rotation is no longer limited by the maximum and minimum radii of the cam. Output rotation is now limited by the input rotation and the cam rotation. To increase the output rotation, all that is required is to increase the input rotation proportionally to keep it at one turn. This means that errors due to the camming operation are now fixed at a constant value for all rotation requirements, and can be designed to meet accuracy requirements. Since the errors are constant, the increase in output rotation actually decreases rather then increases the error appearing in the output. The actual cam rotation is still limited by the maximum and minimum cam radii, but the difference between the maximum and minimum radii is relatively small and therefore the limiting conditions are extended to a point where they are no longer a problem. Since the slope and ratio changes are no longer of a high value the loading effects are also eliminated.

The expanded view of the cam correcting differential shown in Fig. 2 has a driving gear 23 in mesh with an input gear 24, with said input gear having a differential gear 25 directly connected therewith. An output gear 26 is directly connected to a second differential gear 27. The input gear is also in mesh with a cam driving gear 28 which is shown having shaft 29 secured thereon with the opposite end of said shaft being securely connected to a cam 30. A cam follower 31 includes a roller 32 pivoted at pivot point 33 to a cam follower arm 34, which arm is secured perpendicular to one end of a spider drive shaft 35, while the opposite end of the spider drive shaft passes freely through an opening 36 in the input gear 24, the differential gear 25, and the interconnecting tubular portion between said gears, with said spider drive shaft 35 securely connected to a spider 37. A pair of spider pinions are mounted on the spider 37 by way of shafts between opposing side frames 38 and 39 forming part of the spider. A first spider pinion 40 is in mesh with a second spider pinion 41, with said first spider pinion also being in mesh with the differential gear 25, while the second spider pinion is in mesh with the second differential gear 27.

From the foregoing, it will be seen that the cam correcting differential has one input gear 24, and one output gear 26 each of which is directly connected to its complemental differential gear, while both pinions carried by the spider are not only in mesh with each other, but are also individually in mesh with one of the differential gears, while the spider rotational motion is controlled by the cam driven from the input.

The cam driving gear 28 is driven by the input gear 24 so that the cam 30 will make one revolution for each revolution of the cam driving gear. However, the spider drive shaft 34 which moves in response to angular displacement of the cam follower 31 will angularly displace the spider relative to the contour of the cam. Therefore, for a given directional rotation of the driving gear 23, which is in mesh with the input gear 24, the spider drive shaft 35 will either add or subtract to the input rotation, and the output gear will be varied accordingly.

The cam 30 is merely representative of a cam of any desirable contour, and curves are shown in Figs. 3, 4, and 5 for representative cams to perform specific functions of an air data computer as presented in the schematic drawing of Fig. 1.

Referring again to Fig. 1, the differential D1 has two inputs respectively connected from the outputs of the static pressure transducer 20, and the differential pressure transducer 21. The differential D1 subtracts the mechanical rotation proportional to the log of the static pressure from the mechanical rotation proportional to the log of differential pressure and produces a mechanical output rotation proportional to the log of the pressure ratio, log $dP/P_s$.

The single output of the differential D1 is fed as an input into the cam correcting differential CCD3, which converts it to a mechanical output rotation proportional to the log of a function of Mach number, $$\log M/\sqrt{1+.2KM^2}$$

where:

M=Mach number.
K=Recovery factor of temperature probe.

The output of the cam correcting differential CCD3 is fed as one input of a pair of inputs, into a conventional differential D4, while the second input of differential D4, which is one-half log $T_i$, where $T_i$ is the indicated temperature, is the output from the temperature transducer 22.

The differential D4 adds the mechanical rotation proportional to one-half the log of indicated temperature (½ log $T_i$), to the mechanical rotation proportional to the log of the function of Mach number $$(\log M/\sqrt{1+.2KM^2})$$

and produces a mechanical output rotation proportional to the log of true airspeed.

The output of the differential D4 is fed as an input into the cam correcting differential CCD5 as a mechanical rotation proportional to the log of true airspeed (log V), and converts it to an output of mechanical rotation linearly proportional to true airspeed.

The output of CCD5 is fed into a transmitter 50 which has an output connectable to a true airspeed indicator of any convenient or conventional type.

Transmitters 51 and 52 provide true airspeed outputs which may be coupled to other airspeed indicators or other devices which may utilize the output.

The output of differential D1 is also coupled to a cam correcting differential CCD2 which converts the mechanical rotation proportional to the log of the pressure ratio, log $dP/P_s$, to a mechanical rotation linearly proportional to Mach number.

The output of the cam correcting differential CCD2 is connected to a transmitter which in turn has an output connection connectable to a Mach number indicator or to any other device using this quantity.

The transmitters which are connected to the output of the cam correcting differentials CCD2 and CCD5 may be of any conventional or convenient type, such as a synchro or a potentiometer. The output of CCD2 after passing through the transmitter 53 can be connected for remote indication of Mach number as generated by the cam correcting differential output of CCD2.

Another transmitter can be connected for remote indication of the true air speed output as generated by the cam correcting differential CCD5.

The outputs of the transmitters in general may be connected in any convenient manner to dial indicators, or may be used as inputs to secondary computers, such as fire control, navigation and bombing computers, or may be used to drive recording instruments such as photographic cameras and other instruments. However, the output of a cam correcting differential may be coupled directly to a pointer, such as by putting a pointer on a shaft from the output of the cam correcting differential and providing a suitable dial for the pointer.

Any number of transmitters may be connected to a cam correcting differential output depending on the particular requirements of the air data computer, and naturally suitable gearing arrangements may be employed to increase or decrease rotational motion to comply with the particular formula of aerodynamics, if this is necessary.

Fig. 3 embraces a set of curves showing the conversion of log $dP/P_s$ rotation to log $M/\sqrt{1+.2KM^2}$ rotation by means of the cam correcting differential CCD3 which modifies log $dP/P_s$ by the amount of cam correction shown on the curve 54. Fig. 3 shows Mach number against input shaft rotation as indicated by the curve 55 bearing the legend "log $dP/P_s$." Mach number plotted against the output shaft rotation is shown by the curve 56 bearing the legend "log $M/\sqrt{1+.2KM^2}$." Degrees input shaft rotation due to cam correction against input shaft rotation is indicated by curve 54 bearing the legend "cam correction vs. log $dP/P_s$ rotation." The input rotation shown by curve 55 requires the correction shown by curve 54 to obtain the output rotation shown by curve 56.

Fig. 4 embraces a set of curves showing the conversion of log of true airspeed (log V) to linear airspeed by means of the cam correcting differential CCD5 which modifies log V by the amount of cam correction shown on the curve 62. Fig. 4 shows true airspeed against output shaft rotation as indicated by the curve 60 bearing the legend "true airspeed output." The curve 61 bearing the legend "log input" shows true airspeed against input shaft rotation. The curve 62 bearing the legend "cam correction vs. input" shows cam correction against input shaft rotation. The input rotation shown by curve 61 requires the correction shown by the curve 62 to obtain the output rotation shown by curve 60.

Fig. 5 shows Mach number plotted against output shaft rotation as indicated by the curve 58 bearing the legend "linear Mach output rotation." Mach number plotted against input shaft rotation is shown by the curve 59 bearing the legend "log $dP/P_s$ input rotation." Degrees input shaft rotation against cam correction is shown by the curve 57 bearing the legend "cam correction vs. input rotation." The input rotation shown by curve 59 requires the correction shown by curve 57 to obtain the output rotation shown by curve 58.

For example, to obtain the cam correction shown by the curve 54 of Fig. 3, which represents curves for CCD3, we may assume an input rotation on curve 55, at one instant, of 100°. The cam driving gear 28, and the cam 30, would also rotate 100° because of the one to one ratio of gears 24 and 28. However, because of the shape of the cam, the follower of the cam would only rotate +26°, as read on the graduations at the right side of Fig. 3. Therefore, the spider drive shaft 35 and its spider 37 would rotate 26° in the same direction as the input gear 24 and its complemental differential gear 25, and the 100° and the +26° would be additive to cause the rotation of the second differential gear 27 and its output gear 26 to have 126° output rotation. By cutting the cam in accordance with the curve 54, we would obtain the desired output rotation as shown by curve 56.

To obtain the cam correction shown by the curve 57 of Fig. 5, which represents curves for CCD2, we may assume an input rotation on curve 59, at one instant, of 100°. The cam driving gear 28 and the cam 30 would also rotate 100° because of the one to one ratio of gears 24 and 28. However, because of the shape of the cam, the follower of the cam would rotate —42°, as read on the graduations at the right side of Fig. 3. Therefore, the spider drive shaft 35 and its spider 37 would rotate 42° in the opposite direction from the input gear 24 and its complemental differenital gear 25, and the 100° and the —42° would be subtractive to cause the rotation of the second differential gear 27 and its output gear 26 to have 58° output rotation. By cutting the cam in accordance with the curve 57, we would obtain the desired output rotation as shown by curve 58.

To obtain the cam correction shown by the curve 62 of Fig. 4, which represents curves for CCD5, we may assume the input rotation on curve 61, at one instant, of 100°. The cam driving gear 28 and the cam 30 would also rotate 100° because of the one to one ratio of gears 24 and 28. However, because of the shape of the cam, the follower of the cam would rotate −68°, as read on the graduations at the right side of Fig. 4. Therefore, the spider drive shaft 35 and its spider 37 would rotate 68°, in the opposite direction from the input gear 24, and its complemental differential gear 25, and the 100° and the −68° would be subtractive to cause the rotation of the second differential gear 27 and its output gear 26 to have 32° output rotation. By cutting the cam in accordance with the curve 62, we would obtain the desired output rotation as shown by curve 60.

In Fig. 6, there is shown an air data computor employing the invention wherein it is possible to have many outputs from the three air flight variables. The instant showing includes outputs for linear Mach number, linear air speed, which may be considered as indicated air speed, linear true airspeed, and linear relative air density. The outputs may have other uses as explained herein.

In Fig. 6, there are blocks 20, 21, and 22 representing static pressure transducer, differential pressure transducer, and temperature transducer, respectively, which in turn have inputs indicated by symbols similar to those shown in Fig. 1 for the representative blocks.

Conventional differentials, such as the spur gear type differential, are shown as D6, D7, D8 and D9. While cam correcting differentials are shown as CCD10 to CCD15 inclusive. Transmitters 63 to 66 inclusive are transmitters similar to those employable in Fig. 1, and may have their outputs connected to a representative indicator in any convenient or conventional manner, such as by the use of synchros, potentiometers, and other means.

Differential D6 has two inputs, one of the inputs is log $P_s$ from the static pressure transducer, and the other input is log $dP$ from the differential pressure transducer, with the output of the differential being log $dP/P_s$ which is coupled to cam correcting differentials CCD10, CCD11, and CCD12. The differential pressure transducer has an output log $dP$ coupled as an input to the cam correcting differential CCD13. The cam correcting differentials CCD12 and CCD13 are coupled to transmitters 63 and 64 respectively. The output of cam correcting differential CCD10 represents log $(1+.2KM^2)$, where:

K=recovery factor of temperature probe.
M=Mach number.

and is coupled to the differential D7 as one input. Said differential has another input, log $T_1$, connected from the temperature transducer. The output of the differential D7 is true air temperature, log T, which is coupled as one input of a differential D9, with a second input to said differential being coupled from an output of the static pressure transducer as log $P_s$. The output of the differential D9 is coupled as an input to the cam correcting differential CCD15, which in turn has its output coupled to the transmitter 66. Differential D9 has an output of relative air density which is log $\rho/\rho_0$ where $\rho$=air density.
$\rho_0$=standard sea level air density.

The ratios between the two symbols give the relative air density.

The output of differential D7 is coupled as one input to differential D8, while an output of CCD11, representing log M, is coupled as the other input to said differential D8. The output of differential D8 is the log of true airspeed, log V, and is coupled as the input to the cam correcting differential CCD14, the output representing linear true airspeed is coupled to the input of transmitter 65, which also may be connected to a suitable true airspeed indicator. The output of the cam correcting differential CCD15 represents linear relative air density and it may be coupled to a transmitter such as 66 with its output coupled to suitable indicating means, or used for other functional purposes.

In the block diagrams no specific gearing arrangements are shown, but it is to be understood that couplings of gears and mechanisms may be employed where necessary to comply with comparable equations such as are presented in Report #837 of the National Advisory Committee for Aeronautics.

While gears 24 and 28 of Fig. 2 have been referred to as having a one to one ratio, it is to be understood that any ratio can be utilized that will rotate the cam of the device, one turn relative to the desired output, so that less than one revolution of the cam embraces the entire range of the correction desired.

Devices employing cams normally are not capable of driving multi-rotation outputs without additional servo applications, whereas a cam correcting device as presented in the instant application will transfer adequate power to drive multi-rotation outputs, or outputs with load characteristics beyond the range of direct cam drive.

Although but one embodiment of the invention has been illustrated and described in detail, various changes and modifications in the form and relative arrangement of parts which will now appear to those skilled in the art, may be made without departing from the scope of the invention.

What is claimed is:

1. For use in an aircraft having means for sensing static atmospheric pressure, means for sensing static atmospheric and total impact differential air pressure, and means for sensing ambient atmospheric temperature, each of said condition sensing means including means to effect an output signal providing a measure of the condition sensed by the condition sensing means during the prevailing flight conditions of the aircraft; an air data computer comprising a first differential coupling means for algebraically summing the static atmospheric pressure output signal and the differential pressure output signal so as to effect a first resultant signal, a first cam correcting differential mechanism driven by said first resultant signal to effect a fourth output signal providing a measure of the Mach number of the aircraft, a second differential coupling means for algebraically summing the ambient atmospheric temperature output signal and said fourth output signal so as to effect a second resultant signal, and a second cam correcting differential mechanism driven by said second resultant signal to effect an output signal providing a measure of the airspeed of the aircraft.

2. For use in an aircraft having means for sensing static atmospheric pressure, means for sensing static atmospheric and total impact differential air pressure, and means for sensing ambient atmospheric temperature, each of said condition sensing means including means to effect an output signal providing a measure of the condition sensed by the condition sensing means during the prevailing flight conditions of the aircraft; an air data computer comprising a first differential coupling means for algebraically summing the static atmospheric pressure output signal and the differential pressure output signal so as to effect a first resultant signal, a first cam correcting differential mechanism driven by said first resulant signal to effect a fourth output signal providing a measure of the Mach number of the aircraft, a second cam correcting differential mechanism driven by said first resultant signal to effect a fifth output correction signal, a second differential coupling means for algebraically summing the ambient atmospheric temperature output signal and said fifth correction signal so as to effect a second resultant signal providing a measure of the true air temperature, a third differential coupling means for algebraically summing the second resultant signal and said fourth output signal so as to effect a third resultant signal, and a third cam correcting differential mechanism driven by said third resultant signal to effect an output signal providing a measure of the true linear airspeed of the aircraft during flight thereof.

3. For use in an aircraft having means for sensing variable air flight conditions including a first member angularly positioned as a measure of a sensed static atmospheric pressure, a second member angularly positioned as a measure of a sensed differential air pressure variable with the airspeed of the aircraft, and a third member angularly positioned as a measure of a sensed ambient atmospheric temperature; a computer apparatus comprising a first differential coupling means for algebraically summing the angular positions of the first and second members, said first coupling means including a fourth output member angularly positioned as a measure of the sum of the angular positions of the first and second members, a first cam correcting differential mechanism driven by said fourth output member, said first cam mechanism including a fifth output member angularly positioned as a measure of the Mach number of the aircraft, a second differential coupling means for algebraically summing the angular positions of the third and fifth members, said second coupling means including a sixth output member angularly positioned as a measure of the sum of the angular positions of the third and fifth members, a second cam correcting differential mechanism driven by said sixth output member, said second cam mechanism including a seventh output member angularly positioned as a measure of the airspeed of the aircraft.

4. For use in an aircraft having means for sensing variable air flight conditions including a first member angularly positioned as a measure of a sensed static atmospheric pressure, a second member angularly positioned as a measure of a sensed differential air pressure variable with the airspeed of the aircraft, and a third member angularly positioned as a measure of a sensed ambient atmospheric temperature; a computer apparatus comprising a first differential coupling means for algebraically summing the angular positions of the first and second members, said first coupling means including a fourth output member angularly positioned as a measure of the sum of the angular positions of the first and second members, a first cam correcting differential mechanism including a fifth angularly movable output member, means coupling said fourth member to said fifth output member for modifying the angular position of said fifth output member, and cam means driven by said fourth member for effecting a predetermined adjustment of said modifying means so as to cause said fifth output member to be angularly positioned as a measure of the Mach number of the aircraft, a second differential coupling means for algebraically summing the angular positions of the third and fifth members, said second coupling means including a sixth output member angularly positioned as a measure of the sum of the angular positions of the third and fifth members, a second cam correcting differential mechanism driven by said sixth output member, said second cam mechanism including a seventh output member angularly positioned as a measure of the airspeed of the aircraft.

5. For use in an aircraft having means for sensing variable air flight conditions including a first member angularly positioned as a measure of a sensed static atmospheric pressure, a second member angularly positioned as a measure of a sensed differential air pressure variable with the airspeed of the aircraft, and a third member angularly positioned as a measure of a sensed ambient atmospheric temperature; a computer apparatus comprising a first differential coupling means for algebraically summing the angular positions of the first and second members, said first coupling means including a fourth output member angularly positioned as a measure of the sum of the angular positions of the first and second members, a first cam correcting differential mechanism driven by said fourth output member, said first cam mechanism including a fifth output member angularly positioned as a measure of the Mach number of the aircraft, a second differential coupling means for algebraically summing the angular positions of the third and fifth members, said second coupling means including a sixth output member angularly positioned as a measure of the sum of the angular positions of the third and fifth members, a second cam correcting differential mechanism including a seventh angularly movable output member, means coupling said sixth member to said seventh output member for modifying the angular position of said seventh output member, and cam means driven by said sixth member for effecting a predetermined adjustment of said modifying means so as to cause said seventh output member to be angularly positioned as a measure of the airspeed of the aircraft.

6. For use in an aircraft having means for sensing variable air flight conditions including a first member angularly positioned as a measure of a sensed static atmospheric pressure, a second member angularly positioned as a measure of a sensed differential air pressure variable with the airspeed of the aircraft, and a third member angularly positioned as a measure of a sensed ambient atmospheric temperature; a computer apparatus comprising a first differential coupling means for algebraically summing the angular positions of the first and second members, said first coupling means including a fourth output member angularly positioned as a measure of the sum of the angular positions of the first and second members, a first cam correcting differential mechanism including a fifth angularly movable output member, means coupling said fourth member to said fifth output member for modifying the angular position of said fifth output member, and cam means driven by said fourth member for effecting a predetermined adjustment of said modifying means so as to cause said fifth output member to be angularly positioned as a measure of the Mach number of the aircraft, a second differential coupling means for algebraically summing the angular positions of the third and fifth members, said second coupling means including a sixth output member angularly positioned as a measure of the sum of the angular positions of the third and fifth members, a second cam correcting differential mechanism including a seventh angularly movable output member, means coupling said sixth member to said seventh output member for modifying the angular position of said seventh output member, and cam means driven by said sixth member for effecting a predetermined adjustment of said modifying means so as to cause said seventh output member to be angularly positioned as a measure of the airspeed of the aircraft.

7. For use in an aircraft having means for sensing variable air flight conditions including a first member angularly positioned as a measure of a sensed static atmospheric pressure, a second member angularly positioned as a measure of a sensed differential air pressure variable with the air speed of the aircraft, and a third member angularly positioned as a measure of a sensed ambient atmospheric temperature; a computer apparatus comprising a first differential coupling means for algebraically summing the angular positions of the first and second members, said first coupling means including a fourth output member angularly positioned as a measure of the sum of the angular positions of the first and second members, a first cam correcting differential mechanism driven by said fourth output member, said first cam mechanism including a fifth output member angularly positioned as a measure of the Mach number of the aircraft, a second cam correcting differential mechanism driven by said fourth output member, said second cam mechanism including a sixth output member angularly positioned as a measure of a predetermined correction, a second differential coupling means for algebraically summing the angular positions of the third and sixth members, said second coupling means including a seventh output member angularly positioned as a measure of the sum of the angular positions of the third and sixth members and a measure of the true air temperature, a third differential coupling means for algebraically summing the angular positions of the fifth and seventh members, said third coupling means including an eighth output member angularly positioned as a measure of the sum of the angular positions of the fifth and seventh members, a third cam correcting differential mechanism driven by said eighth output member, said third cam mechanism including a ninth output member angularly positioned as a measure of the true linear airspeed of the aircraft during flight thereof.

8. The combination defined by claim 7 in which the first cam correcting differential mechanism includes means coupling said fourth member to said fifth output member for modifying the angular position of said fifth output member, and cam means driven by said fourth member for effecting a predetermined adjustment of said modifying means so as to cause said fifth output member to be angularly positioned as a measure of the Mach number of the aircraft; the second cam correcting differential mechanism includes means coupling said fourth member to said sixth output member for modifying the angular position of said sixth output member, and cam means driven by said fourth member for effecting a predetermined adjustment of said modifying means so as to cause said sixth output member to be angularly positioned as a measure of the predetermined correction; the third cam correcting differential mechanism includes means coupling said eighth member to said ninth output member for modifying the angular position of said ninth output member, and cam means driven by said eighth member for effecting a predetermined adjustment of said modifying means so as to cause said ninth output member to be angularly positioned as a measure of the linear airspeed of the aircraft during flight thereof.

References Cited in the file of this patent

UNITED STATES PATENTS

| | | |
|---|---|---|
| 841,445 | Richards | Jan. 15, 1907 |
| 1,409,900 | Adams | Mar. 21, 1922 |
| 2,157,705 | Jones | May 9, 1939 |
| 2,229,156 | Wertheimer | Jan. 21, 1941 |
| 2,444,549 | Anderson | July 6, 1948 |
| 2,457,287 | Townes | Dec. 28, 1948 |
| 2,524,749 | Baldridge et al. | Oct. 10, 1950 |
| 2,598,681 | Gararini | June 3, 1952 |
| 2,751,786 | Coulbourn et al. | Nov. 23, 1956 |

FOREIGN PATENTS

| | | |
|---|---|---|
| 740,783 | Germany | Oct. 28, 1943 |